US006903881B2

(12) United States Patent
Baba

(10) Patent No.: US 6,903,881 B2
(45) Date of Patent: Jun. 7, 2005

(54) PROJECTION OPTICAL SYSTEM AND PROJECTION-TYPE IMAGE DISPLAY APPARATUS USING IT

(75) Inventor: Tomoyuki Baba, Ageo (JP)

(73) Assignee: Fujinon Corporation, Saitama (JP)

( * ) Notice: Subject to any disclaimer, the term of this patent is extended or adjusted under 35 U.S.C. 154(b) by 26 days.

(21) Appl. No.: 10/606,784

(22) Filed: Jun. 27, 2003

(65) Prior Publication Data

US 2004/0032666 A1 Feb. 19, 2004

(30) Foreign Application Priority Data

Aug. 19, 2002 (JP) ........................................ 2002-238366

(51) Int. Cl.[7] .............................................. G02B 17/04
(52) U.S. Cl. ...................................................... 359/733
(58) Field of Search ................................ 359/726–737, 359/627–637

(56) References Cited

U.S. PATENT DOCUMENTS 6,084,715 A     7/2000  Aoki et al.
6,163,400 A  * 12/2000  Nanba ......................... 359/365
6,178,048 B1   1/2001  Togino et al.
6,204,978 B1 *  3/2001  Akiyama et al. ........... 359/729
6,510,006 B1   1/2003  Togino

* cited by examiner

*Primary Examiner*—Scott J. Sugarman
*Assistant Examiner*—Darryl J. Collins
(74) *Attorney, Agent, or Firm*—Arnold International; Jon W. Henry; Bruce Y. Arnold

(57) ABSTRACT

Small projection optical systems and projection-type image display apparatuses use a plurality of prisms with internally reflecting surfaces with optical power, an incident light refracting surface, and an exit light refracting surface in order to project an image of an image display element on a nearby screen. The ratio of the distance to the screen from the exit light refracting surface of the projection optical system and the distance to the image display apparatus from the incident light refracting surface of the projection optical system satisfies a condition that the ratio be less than twenty. A diaphragm that serves as an aperture stop is placed between two of the prisms. The internally reflecting surfaces may be free-form surfaces or simpler rotationally symmetric aspheric surfaces. Six internally reflecting surfaces of free-form shape are disclosed in a preferred embodiment.

20 Claims, 2 Drawing Sheets

PROJECTION OPTICAL SYSTEM AND PROJECTION-TYPE IMAGE DISPLAY APPARATUS USING IT

BACKGROUND OF THE INVENTION

Recently, various types of image display elements have been developed and, accordingly, there exist projection optical systems and projection-type image display apparatuses with a variety of applications and with a wide range of distances between the image display element and a screen that displays an image. For example, some projection optical systems and projection-type image display apparatuses using same are designed with a relatively small distance between the image display element and screen, including those where the projection-type image display apparatuses are preferably portable. The desire for portability of such projection-type image display apparatuses makes it desirable that they be small, which in turn requires a corresponding small size of the projection optical system.

In general, projection optical systems used in prior art projection-type image display apparatuses include combinations of lenses. However, the use of such combinations of lenses prevents the projection-type image display apparatuses from being as small as desired because of the optical path lengths required for enlargement and projection even when optical elements for folding the optical paths are provided in the projection optical systems.

BRIEF SUMMARY OF THE INVENTION

The present invention relates to small projection optical systems that provide the necessary optical path length for enlargement and projection so that they are suitable for projection-type image display apparatuses having a relatively small distance between the image display element and a screen that displays an image, and also relates to such projection-type image display apparatuses.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 1:
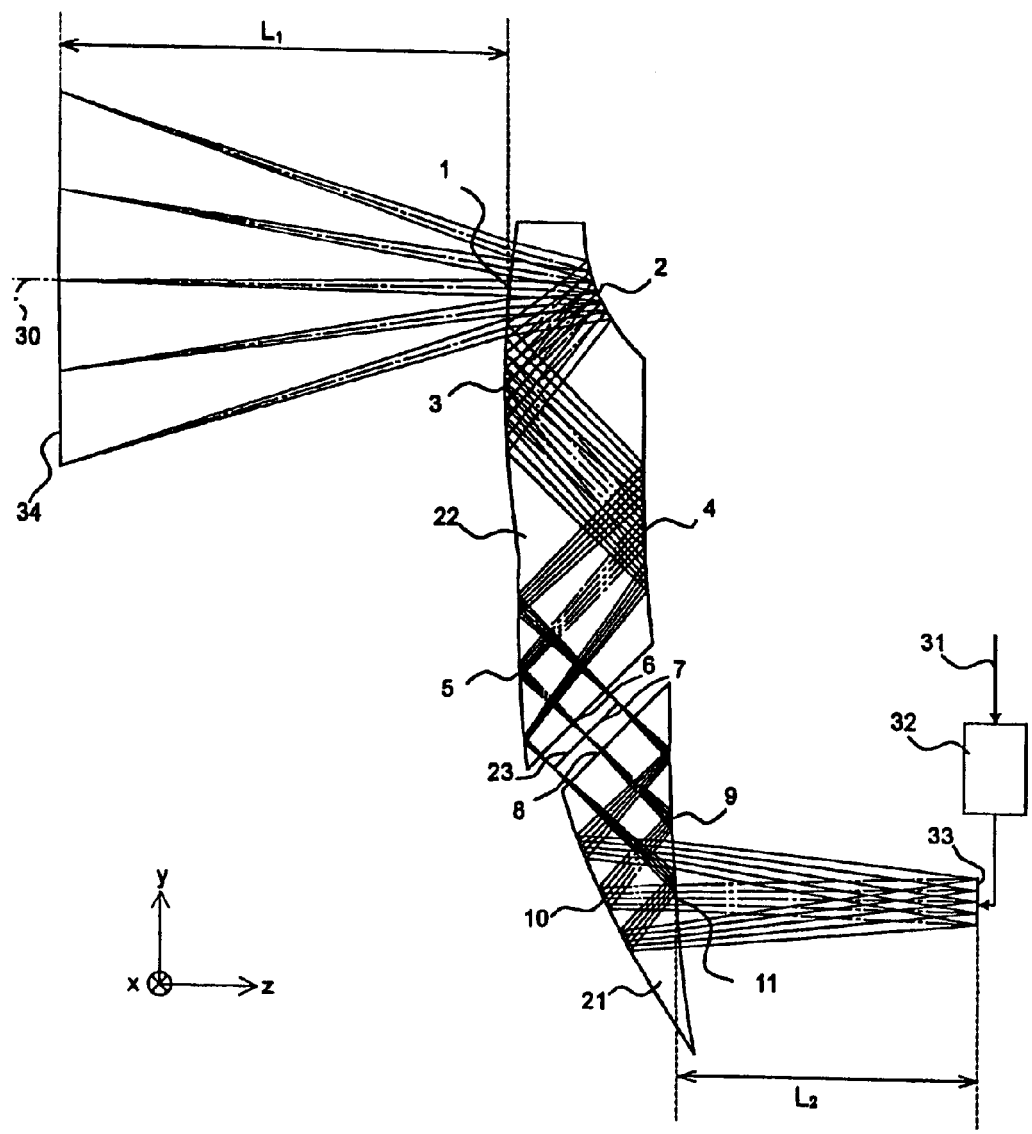
FIG. 1 shows a cross-sectional view of a projection-type image display apparatus that includes a projection optical system of the present invention.

The present invention will first be described generally in terms of a preferred embodiment with reference to FIG. 1. FIG. 1 shows a cross-sectional view of a projection-type image display apparatus that includes a projection optical system of the present invention. As shown in FIG. 1, the projection optical system includes internally reflecting prisms 21 and 22 that include incident light refracting surfaces, plural reflecting surfaces having optical power, exit light refracting surfaces, and a diaphragm 23 that acts as an aperture stop provided in the space between the internally reflecting prisms 21 and 22. An image is displayed on an image display element 33, for example a liquid crystal display panel, according to signals from an image display circuit board 32 based on external input image signals. Illumination light from an illumination optical system (not shown) is modulated by the image display element 33 and is transmitted as projected image light. The projected image is processed by the first internally reflecting prism 21, the diaphragm 23, and the second internally reflecting prism 22, in sequence, in order to form an enlarged projected image on a screen 34. The optical axis 30 is also shown in FIG. 1.

After entering the first internally reflecting prism 21 at the incident light refracting surface 11 on the image display element side, the projected light undergoes total internal reflection at a surface 10 having optical power and then undergoes total internal reflection by a surface 9 having optical power before exiting from the exit light refracting surface 8. Then, the projected light passes through the diaphragm 23 that acts as an aperture stop, enters the second internally reflecting prism 22 at the incident light refracting surface 6, undergoes total internal reflection at a surface 5 having optical power, and undergoes total internal reflection at surfaces 4 and 3 having optical power. The light is then further totally internally reflected within the prism 22 by a surface 2 having optical power before the light exits from the exit light refracting surface 1. The refractive and reflective effects of the prism surfaces 11 to 8 and 6 to 1 of the first and second internally reflecting prisms 21 and 22 enable the projected light to form an image on the screen 34.

As explained previously, in the prior art, the projection optical system for forming images on a screen generally includes a combination of lenses. In contrast, in the present invention, internally reflecting prisms are used, which enables a smaller projection optical system with fewer optical components compared to a projection optical system that includes combinations of lenses. Projected light can be directed in any desired direction after several total reflections within the internally reflecting prisms to obtain the required optical path length compactly as compared to more linear arrangements of the optical paths. When combinations of lenses are used as taught in the prior art, compactness can also be achieved. However, that requires the use of multiple mirrors that increases the number of optical elements even more.

As shown in FIG. 1, the display surface of the image display element 33 and the screen 34 are parallel to each other. As also shown in FIG. 1, the z direction is orthogonal to the parallel surfaces that extend in the x and y directions, with the upward direction of the y axis as shown in FIG. 1 being positive. The optical path is folded in the z direction, which enables a reduced distance in the z direction between the image display element 33 and the screen 34 so as to form a small projection-type image display apparatus.

The reduction of the thickness of the projection optical system and the projection-type image display apparatus in the z direction is referred to as flattening the projection-type image display apparatus. The flattening enables the projection-type image display apparatus to be sufficiently small to be easily transported. Furthermore, a screen (for example) can be provided for the image display of a digital camera in lieu of using a liquid crystal display panel and the projection optical system of the present invention can be used to project images onto the screen. In this way, a remarkably smaller image display can be used as compared with the size of display when a liquid crystal display panel is used as in the prior art.

In significantly reducing the size of the projection optical system and the projection-type image display apparatus, it is particularly useful if the screen is close to the image display element. Preferably, the following condition is satisfied:

$$L1/L2 < 20 \qquad \text{Condition(1)}$$

where

L1 is the on-axis distance between the exit light refracting surface 1 of the second internally reflecting prism 22 nearest the screen in the projection optical system and the screen 34 that is on the enlarging side of the projection optical system, and L2 is the on-axis distance between the incident light refracting surface 11 of the first internally reflecting prism 21 nearest the image display element in the projection optical system and the image display element 33 that is on the reducing side of the projection optical system.

In other words, L1 is the conjugate distance as measured on-axis on the enlarging side between the exit light refracting surface of the projection optical system and the projected image, and L2 is the conjugate distance as measured on-axis on the reducing side between the image display element and the incident light refracting surface of the projection optical system.

The reflecting surfaces 2 to 5, 9 and 10 of the prisms of the projection optical system have optical power. Reflections by these surfaces do not produce chromatic aberrations, and therefore help reduce the overall chromatic aberration. It is desirable and advantageous in correcting chromatic aberrations that the incident light and exit light surfaces of the internally reflecting prisms have less refractive power and that the reflecting surfaces have greater refractive power.

The projection optical system of the present invention operates with finitely separated optical conjugates without using any additional converging optics.

It is relatively easy with the projection optical system of the present invention to direct light as desired by appropriately defining the orientations of the incident light surface, the exit light surface, and the internally reflecting surfaces of the prisms. The projection optical systems and projection-type image display apparatuses have a high degree of freedom of design.

Aspheric surfaces can be used as the incident light refracting surfaces 6 and 11, the exit light refracting surfaces 1 and 8, and the internally reflecting surfaces 2 to 5, 9, and 10 in order to achieve excellent imaging performance. Aspheric surfaces in a broad sense include, as more limited shapes, free-form or rotationally symmetrical aspheric surfaces which can be appropriately used for excellent imaging performance. A free-form surface is defined by the following free-form surface equation. A free-form surface has a high degree of freedom, and thus provides a high degree of freedom in directing the light. In addition, free-form surfaces can be used to satisfactorily correct aberrations that occur on the tilted and displaced internally reflecting surfaces. A free-form surface is defined by the following Equation (A):

$$Z=C \cdot (X^2+Y^2)/[1+\{1-K \cdot C^2 \cdot (X^2+Y^2)\}^{1/2}]+\Sigma A_n \cdot Y^n+\Sigma C_{ij} \cdot x^i \cdot y^j \quad \text{Equation (A)}$$

where

Z is the length (in mm) of a line drawn from a point on the free-form surface at a distance x in the x direction and Y in the y direction from the optical axis to the tangential plane of the free-form surface vertex, C is the curvature (=1/the radius of curvature, R) of the free-form surface at the optical axis, X is the distance in the x direction from the optical axis, Y is the distance in the y direction from the optical axis, K is the eccentricity, $\Sigma A_n \cdot Y^n$ is over n where $A_n$ is the nth aspheric coefficient, and $\Sigma C_{ij} \cdot x^i \cdot y^j$ (summation of $C_{ij} \cdot x^i \cdot y^j$) is over i and j where $C_{ij}$ is the ith,jth free-form coefficient.

Rotationally symmetric aspheric surfaces, which are further restricted surfaces among free-form surfaces and easier to produce, are defined by the following rotationally symmetric aspheric equation:

$$Z=[(C_1 \cdot Y^2)/\{1+(1-K \cdot C_1^2 \cdot Y^2)^{1/2}\}]+\Sigma A_n \cdot Y^n \quad \text{Equation (B)}$$

where

Z is the length of a line drawn from a point on the aspheric lens surface at a distance Y from the optical axis to the tangential plane of the aspheric surface vertex, $C_1$ is the curvature (=1/the radius of curvature, R) of the aspheric lens surface near the optical axis, Y is the distance from the optical axis, K is the eccentricity, and $\Sigma A_n \cdot Y^n$ (summation of $A_n \cdot Y^n$) is over n where $A_n$ is the nth aspheric coefficient.

Optical systems are known that use prisms with free-form surfaces, for example, in head-mounted displays in which the viewer's eyes are situated at the exit pupil(s) outside the prism. However, with this configuration, the viewer observes the virtual images of images displayed on the image display element. In contrast, the present invention has a structure in which images on the image display element are formed on a screen that is close to the projection optical system.

The preferred embodiment, described in general terms above, will now be described in more detail. The projection optical system of this specific embodiment and the projection-type display device using it includes the structure described previously with regard to FIG. 1 and is further constructed as described below with regard to FIG. 1. In this specific embodiment, surfaces 2 and 10 are mirrored reflective surfaces so that they operate to reflect light even if the incident light is not incident at an angle equal to or larger than the critical angle. The mirrored surfaces 2 and 10 are also internally reflecting surfaces, as herein defined, because they reflect light internally of the prisms even though reflection is not based on the angle of incidence of the light being greater than the critical angle so as to provide total internal reflection. Additionally, as shown in FIG. 1, reflecting surface 9 of the first prism 21 is on a common prism surface with the incident light refracting surface 11 and reflecting surfaces 3 and 5 are on a common prism surface with exit light refracting surface 1.

The incident light refracting surface 11, exit light refracting surface 1, and reflecting surfaces 2, 3, 4, 5, 9, and 10 are free-form surfaces defined by the free-form Equation (A) above, where K is equal to unity and $A_n$ is equal to zero for all n, related basically to spherical surfaces.

Table 1 below lists the surface number #, in order from the object (OBJ), which is screen 34, the radius of curvature R of each surface near the optical axis, the on-axis surface spacing D between surfaces, as well as the refractive index $N_e$ and the Abbe number $v_e$ (both at the e-line of 546.1 nm) of each surface of the specific embodiment being described. The values are based on a normalized on-axis focal length of one. All distances in the Tables that follow and referenced in the discussions that follow are without units because their values are relative to a normalized focal length of unity. In Table 1, the image (IMG) is the display surface of the liquid crystal display panel 33 that is an image display element. The surfaces are numbered, as shown in FIG. 1, in order from OBJ to IMG in the direction opposite to the direction that light travels through the projection-type image display apparatus, with the surface 7 being the diaphragm surface.

TABLE 1

| # | R | D | $N_e$ | $v_e$ |
|---|---|---|---|---|
| OBJ | ∞ | 0.553 | | |
| 1* | 2.015 | 0.116 | 1.53333 | 55.5 |
| 2* | 0.416 | −0.116 | 1.53333 | 55.5 |
| 3* | 2.015 | 0.176 | 1.53333 | 55.5 |
| 4* | 0.695 | −0.158 | 1.53333 | 55.5 |
| 5* | −2.319 | 0.068 | 1.53333 | 55.5 |
| 6 | ∞ | 0.014 | | |
| 7 | ∞ | 0.020 | | |
| 8 | ∞ | 0.096 | 1.53333 | 55.5 |
| 9* | −3.616 | 0.044 | 1.53333 | 55.5 |
| 10* | 1.532 | −0.044 | 1.53333 | 55.5 |
| 11* | −3.616 | 0.368 | | |
| IMG | ∞ | | | |

The surfaces with a * to the right of the surface number in Table 1 are of free-form shape, and the free-form shape is expressed by Equation (A) above. In this specific embodiment, as shown in Table 1, the distance L1 between the exit light refracting surface 1 of the second internally reflecting prism 22 and the screen 34 is 0.553 and the distance L2 between the incident light refracting surface 11 of the first internally reflecting prism 21 and the image display element 33 is 0.368, and Condition (1) that L1/L2<20 is satisfied. In fact, as shown in Table 1, L1 and L2 are of the same order of magnitude, with L1 being less than twice L2.

Additionally, the diaphragm 7 is positioned so that light rays from a point on the optical axis of the image display apparatus 33 are substantially parallel to one another as they pass through the diaphragm 7 so that diaphragm 7 operates as an aperture stop. In fact, it operates as what is herein defined as an ideal aperture stop in terms of the rays being substantially parallel rather than slightly convergent or slightly divergent at the diaphragm. The diaphragm of the present invention operates as an ideal aperture stop for finitely separated optical conjugates of the image display apparatus and the screen without any additional converging optics but cannot operate as an ideal aperture stop with an infinitely distant conjugate, unlike prior art projection optical systems that are designed for imaging objects from infinity or providing an image at infinity, for example, an image that is further processed by converging lenses. That is, a diaphragm of a projection optical system of the present invention can operate as an ideal aperture stop only for finitely separated optical conjugates and does so in image projection display devices of the present invention. The proximity of the possible conjugates prevents the diaphragm of the present invention from operating as an ideal aperture stop with an infinitely distant conjugate.

Table 2 below shows the tilts and displacements of the numbered surfaces of Table 1 above. In the specific embodiment being described, displacements occur only in the y direction, denoted in Table 2 under the heading "Y," while no displacements occur in the x and z directions, as shown in FIG. 1, denoted by the headings "X" and "Z," respectively. Similarly, in the specific embodiment being described, tilts in degrees, defined by rotation about the center axes of the surfaces, occur only about the y axis, as shown in FIG. 1, are denoted in Table 2 under the heading "α" with the convention that anticlockwise rotations about the y axis are positive, and no tilts occur about the x and z axes denoted in Table 2 under the headings "β" and "γ" respectively.

TABLE 2

| # | X | Y | Z | α | β | γ |
|---|---|---|---|---|---|---|
| 1 | 0.0000 | −0.0096 | 0.0000 | −0.525 | 0.0000 | 0.0000 |
| 2 | 0.0000 | −0.0004 | 0.0000 | 19.809 | 0.0000 | 0.0000 |
| 3 | 0.0000 | −0.0096 | 0.0000 | −0.525 | 0.0000 | 0.0000 |
| 4 | 0.0000 | −0.0179 | 0.0000 | −1.206 | 0.0000 | 0.0000 |
| 5 | 0.0000 | −0.0254 | 0.0000 | 4.808 | 0.0000 | 0.0000 |
| 6 | 0.0000 | −0.0277 | 0.0000 | −44.269 | 0.0000 | 0.0000 |
| 7 | 0.0000 | −0.0286 | 0.0000 | −44.269 | 0.0000 | 0.0000 |
| 8 | 0.0000 | −0.0295 | 0.0000 | −44.269 | 0.0000 | 0.0000 |
| 9 | 0.0000 | −0.0406 | 0.0000 | 8.988 | 0.0000 | 0.0000 |
| 10 | 0.0000 | −0.0505 | 0.0000 | 36.169 | 0.0000 | 0.0000 |
| 11 | 0.0000 | −0.0406 | 0.0000 | 8.988 | 0.0000 | 0.0000 |

Table 3 below lists the values of the constants $C_{ij}$ used in Equation (A) above for each of the free-form surfaces indicated in Table 1. An "E" in the data indicates that the number following the "E" is the exponent to the base 10. For example, "1.0E-02" represents the number $1.0 \times 10^{-2}$.

TABLE 3

| # | $C_{10}$ | $C_{01}$ | $C_{20}$ | $C_{11}$ | $C_{02}$ | $C_{30}$ | $C_{21}$ |
|---|---|---|---|---|---|---|---|
| 1 | 0.000 | −3.185 | 1.121 | 0.000 | 1.608E-1 | 0.000 | 4.718E-2 |
| 2 | 0.000 | −2.401 | 7.088E-1 | 0.000 | 9.753E-1 | 0.000 | 2.931E-2 |
| 3 | 0.000 | −3.185 | 1.121 | 0.000 | 1.608E-1 | 0.000 | 4.718E-2 |
| 4 | 0.000 | −3.474 | 2.935 | 0.000 | −4.314E-1 | 0.000 | 2.892E-1 |
| 5 | 0.000 | 1.538 | 1.548 | 0.000 | 4.973E-1 | 0.000 | 3.883E-2 |
| 9 | 0.000 | 3.868 | 1.119 | 0.000 | 2.849E-1 | 0.000 | 5.846E-2 |
| 10 | 0.000 | 2.744 | 6.457E-1 | 0.000 | −3.186E-1 | 0.000 | 1.092E-2 |
| 11 | 0.000 | 3.868 | 1.119 | 0.000 | 2.849E-1 | 0.000 | 5.846E-2 |

| # | $C_{12}$ | $C_{03}$ | $C_{40}$ | $C_{31}$ | $C_{22}$ | $C_{13}$ | $C_{04}$ |
|---|---|---|---|---|---|---|---|
| 1 | 0.000 | 7.114E-3 | −2.415E-3 | 0.000 | −2.0931E-3 | 0.000 | −6.658E-4 |
| 2 | 0.000 | −9.293E-3 | −9.353E-3 | 0.000 | −2.123E-2 | 0.000 | −6.079E-3 |
| 3 | 0.000 | 7.114E-3 | −2.415E-3 | 0.000 | −2.093E-3 | 0.000 | −6.658E-4 |
| 4 | 0.000 | −1.695E-2 | 2.314E-2 | 0.000 | 5.100E-3 | 0.000 | 2.397E-4 |
| 5 | 0.000 | −4.114E-3 | 6.466E-4 | 0.000 | −9.190E-5 | 0.000 | 3.170E-4 |
| 9 | 0.000 | −1.057E-2 | −1.298E-3 | 0.000 | 3.743E-4 | 0.000 | 7.805E-4 |
| 10 | 0.000 | 1.067E-2 | 7.488E-5 | 0.000 | 7.200E-5 | 0.000 | 4.855E-5 |
| 11 | 0.000 | −1.057E-2 | −1.298E-3 | 0.000 | 3.743E-4 | 0.000 | 7.805E-4 |

TABLE 3-continued

| # | $C_{50}$ | $C_{41}$ | $C_{32}$ | $C_{23}$ | $C_{14}$ | $C_{05}$ | $C_{60}$ |
|---|---|---|---|---|---|---|---|
| 1 | 0.000 | 2.887E-5 | 0.000 | 5.152E-6 | 0.000 | 1.979E-6 | 9.603E-8 |
| 2 | 0.000 | 3.652E-5 | 0.000 | -1.936E-5 | 0.000 | 6.452E-5 | -1.576E-9 |
| 3 | 0.000 | 2.887E-5 | 0.000 | 5.152E-6 | 0.000 | 1.979E-6 | 9.603E-8 |
| 4 | 0.000 | 1.557E-5 | 0.000 | 3.606E-5 | 0.000 | 7.522E-6 | 2.667E-10 |
| 5 | 0.000 | -8.949E-6 | 0.000 | -7.706E-6 | 0.000 | 1.317E-6 | 5.067E-8 |
| 9 | 0.000 | -9.534E-5 | 0.000 | -1.546E-5 | 0.000 | -4.349E-8 | -1.229E-10 |
| 10 | 0.000 | -9.329E-6 | 0.000 | -3.298E-7 | 0.000 | 0.000 | -3.970E-10 |
| 11 | 0.000 | -9.534E-5 | 0.000 | -1.546E-5 | 0.000 | -4.349E-8 | -1.229E-10 |

| # | $C_{51}$ | $C_{42}$ | $C_{33}$ | $C_{24}$ | $C_{15}$ | $C_{06}$ | $C_{70}$ |
|---|---|---|---|---|---|---|---|
| 1 | 0.000 | 2.129E-8 | 0.000 | 3.202E-8 | 0.000 | 0.000 | 0.000 |
| 2 | 0.000 | 1.689E-10 | 0.000 | 2.847E-10 | 0.000 | 8.688E-10 | 0.000 |
| 3 | 0.000 | 2.129E-8 | 0.000 | 3.202E-8 | 0.000 | 0.000 | 0.000 |
| 4 | 0.000 | 6.277E-10 | 0.000 | 6.766E-10 | 0.000 | 0.000 | 0.000 |
| 5 | 0.000 | -6.910E-10 | 0.000 | -9.752E-9 | 0.000 | -9.890E-8 | 0.000 |
| 9 | 0.000 | -1.870E-8 | 0.000 | 2.222E-8 | 0.000 | -3.412E-7 | 0.000 |
| 10 | 0.000 | 2.068E-7 | 0.000 | 0.000 | 0.000 | 0.000 | 0.000 |
| 11 | 0.000 | -1.870E-8 | 0.000 | 2.222E-8 | 0.000 | -3.412E-7 | 0.000 |

| # | $C_{61}$ | $C_{52}$ | $C_{43}$ | $C_{34}$ | $C_{25}$ | $C_{16}$ | $C_{07}$ |
|---|---|---|---|---|---|---|---|
| 1 | 1.138E-7 | 0.000 | 3.232E-9 | 0.000 | 0.000 | 0.000 | 0.000 |
| 2 | 4.314E-9 | 0.000 | 4.382E-10 | 0.000 | -2.593E-10 | 0.000 | 2.007E-9 |
| 3 | 1.138E-7 | 0.000 | 3.232E-9 | 0.000 | 0.000 | 0.000 | 0.000 |
| 4 | 7.975E-10 | 0.000 | 2.826E-9 | 0.000 | -5.092E-9 | 0.000 | 0.000 |
| 5 | 5.142E-8 | 0.000 | -1.051E-8 | 0.000 | -9.450E-9 | 0.000 | -8.044E-8 |
| 9 | -1.727E-8 | 0.000 | -1.599E-7 | 0.000 | 0.000 | 0.000 | 0.000 |
| 10 | 2.993E-8 | 0.000 | 0.000 | 0.000 | 0.000 | 0.000 | 0.000 |
| 11 | -1.727E-8 | 0.000 | -1.599E-7 | 0.000 | 0.000 | 0.000 | 0.000 |

As shown in Table 3, the constants Cij of the free-form surfaces are all zero where i is an odd number. Thus, the free-form surfaces include only one surface parallel to the y-z plane. In this way, plane symmetrical free-form surfaces having only one plane of symmetry can be used to satisfactorily correct aberrations caused by the tilts and displacements of the surfaces.

Figure 2:
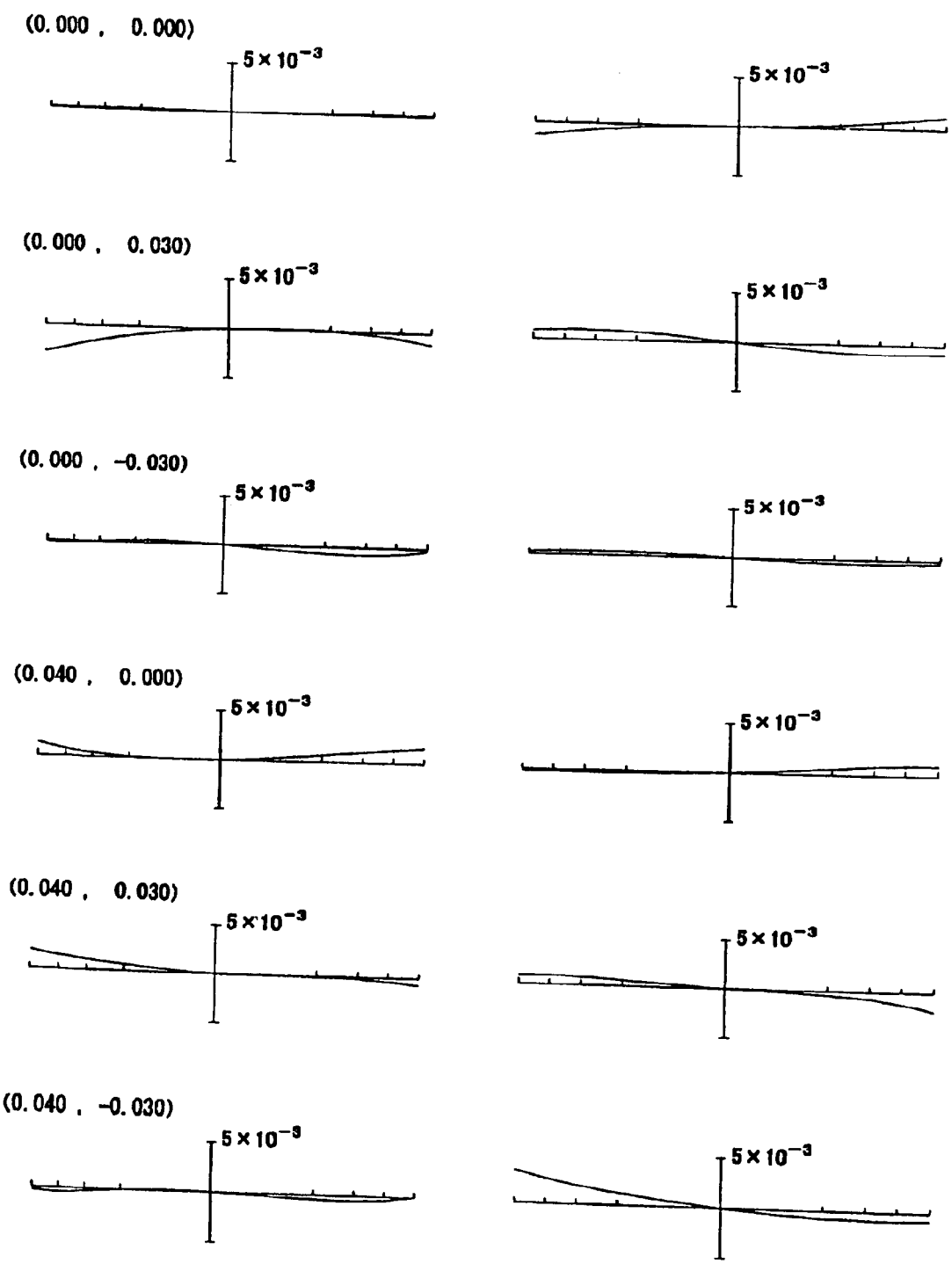
FIG. 2 shows graphs of transverse aberrations of the projection optical system of an embodiment of the present invention.

FIG. 2 shows graphs of transverse aberrations of the projection optical system of this specific embodiment of the present invention. The numerals in parenthesis above each row of graphs indicate the (X, Y) coordinates of the image display element for that row, based on the focal length of the projection optical system being normalized to one. In each row, the graph on the left shows the transverse aberration in the y direction and the graph on the right shows the transverse aberration in the x direction. As shown in FIG. 2, the projection optical system of this specific embodiment has the transverse aberrations favorably corrected.

The projection optical system of the present invention does not form an intermediate image of the image display element between the exit light refracting surface of the internally reflecting prism closest to said screen and the incident light refracting surface of the internally reflecting prism closest to said image display element. Additionally, the projection optical system of the present invention can operate with finitely separated conjugates without any additional converging optics.

The invention being thus described, it will be obvious that the same may be varied in many ways. For example, the internally reflecting prisms may combine reflecting surfaces having optical power and reflecting surfaces not having an optical power, and the number of reflecting surfaces may be varied. The contours, radii of curvature, displacements in all directions, and tilts about all axes of all of the reflecting surfaces and incident light and exit light refracting surfaces may be varied. The projection optical system may include more than two prisms that include incident light refracting surfaces, reflecting surfaces, and exit light refracting surfaces, including prisms without internally reflecting surfaces, or the projection optical system may include only a single prism that provides sufficient reflecting surfaces that may or may not include an interior diaphragm of the type that may easily be placed between plural prisms. Even when plural prisms are used, which allows easy placement of the diaphragm between the prisms, including prisms having internally reflecting surfaces, as appropriate and desired, the diaphragm may be omitted even though it is useful for eliminating stray light. Of course, increasing the number of prisms generally, and increasing the number of incident light and exit light refracting surfaces and reflecting surfaces provides more degrees of freedom in the design, especially with free-form surface contours, that assist in the correction of aberrations. Additionally, the image display element of a projection-type image display apparatus according to the present invention can be, for example, a transmissive or reflective liquid crystal or a DMD image display element. Furthermore, mirrors and lenses for turning the light can be appropriately provided in the projection optical system according to the present invention and the projection-type image display apparatus using it. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A projection optical system for enlarging and projecting an image of an image display element onto a screen comprising:
   a first prism that includes an incident light refracting surface for receiving light from the image display element, said incident light refracting surface being the incident light refracting surface of the projection optical system;

a second prism that includes an exit light refracting surface for emitting light toward the screen, said exit light refracting surface being the exit light refracting surface of the projection optical system; and prism internally reflecting surfaces having optical power arranged so that light that enters said incident light refracting surface from the image display element is reflected at least six times before exiting said exit light refracting surface;

wherein the projection optical system does not form an intermediate image of the image display element between said incident light refracting surface and said exit light refracting surface; and the projection optical system can operate with finitely separated conjugates without any additional converging optics.

2. The projection optical system of claim 1, including one or more additional prisms having internally reflecting surfaces.

3. The projection optical system of claim 2, including a diaphragm positioned between two prisms.

4. The projection optical system of claim 3, wherein said diaphragm operates as an ideal aperture stop only for finitely separated optical conjugates.

5. The projection optical system of claim 1, wherein at least one surface of the following surfaces of at least one prism is an aspheric surface: an incident light refracting surface, an internally reflecting surface, or an exit light refracting surface.

6. The projection optical system of claim 1, wherein at least one surface of the following surfaces of at least one prism is a free-form surface: an incident light refracting surface, an internally reflecting surface, or an exit light refracting surface.

7. The projection optical system of claim 1, wherein at least one surface of the following surfaces of at least one prism is a rotationally symmetric aspherical surface: an incident light refracting surface, an internally reflecting surface, or an exit light refracting surface.

8. The projection optical system of claim 4, wherein the finitely separated optical conjugates for which the diaphragm operates as an ideal aperture stop satisfy the following condition:

$$L1/L2 < 20$$

where

L1 is the conjugate distance of the projection optical system as measured on-axis on the enlarging side between said exit light refracting surface and said projected image, and L2 is the conjugate distance of the projection optical system as measured on-axis on the reducing side between said image display element and said incident light refracting surface.

9. The projection optical system of claim 8, wherein L1 and L2 are of the same order of magnitude.

10. A projection-type image display apparatus, comprising:

an image display apparatus;

a screen; and the projection optical system of claim 1 for projecting an enlarged image of said image display apparatus onto said screen.

11. A projection-type image display apparatus, comprising:

an image display apparatus;

a screen; and the projection optical system of claim 2 for projecting an enlarged image of said image display apparatus onto said screen.

12. A projection-type image display apparatus, comprising:

an image display apparatus;

a screen; and the projection optical system of claim 3 for projecting an enlarged image of said image display apparatus onto said screen.

13. A projection-type image display apparatus, comprising:

an image display apparatus;

a screen; and the projection optical system of claim 4 for projecting an enlarged image of said image display apparatus onto said screen.

14. A projection-type image display apparatus, comprising:

an image display apparatus;

a screen; and the projection optical system of claim 5 for projecting an enlarged image of said image display apparatus onto said screen.

15. A projection-type image display apparatus, comprising:

an image display apparatus;

a screen; and the projection optical system of claim 6 for projecting an enlarged image of said image display apparatus onto said screen.

16. A projection-type image display apparatus, comprising:

an image display apparatus;

a screen; and the projection optical system of claim 7 for projecting an enlarged image of said image display apparatus onto said screen.

17. A projection-type image display apparatus, comprising:

an image display apparatus;

a screen; and the projection optical system of claim 1 for projecting an enlarged image of said image display apparatus onto said screen;

wherein the following condition is satisfied:

$$L1/L2 < 20$$

where

L1 is the conjugate distance as measured on-axis on the enlarging side between said exit light refracting surface of the projection optical system and said projected image, and L2 is the conjugate distance as measured on-axis on the reducing side between said image display element and said incident light refracting surface of the projection optical system.

18. A projection-type image display apparatus, comprising:

an image display apparatus;

a screen; and the projection optical system of claim 3 for projecting an enlarged image of said image display apparatus onto said screen;

wherein the following condition is satisfied:

$$L1/L2 < 20$$

where

L1 is the conjugate distance as measured on-axis on the enlarging side between said exit light refracting surface of the projection optical system and said projected image, and L2 is the conjugate distance as measured on-axis on the reducing side between said image display element and said incident light refracting surface of the projection optical system.

19. A projection-type image display apparatus, comprising:

an image display apparatus;

a screen; and the projection optical system of claim 4 for projecting an enlarged image of said image display apparatus onto said screen;

wherein the following condition is satisfied:

$$L1/L2 < 20$$

where

L1 is the conjugate distance as measured on-axis on the enlarging side between said exit light refracting surface of the projection optical system and said projected image, and L2 is the conjugate distance as measured on-axis on the reducing side between said image display element and said incident light refracting surface of the projection optical system.

20. The projection-type image display apparatus of claim 19, wherein L1 and L2 are of the same order of magnitude.

* * * * *

UNITED STATES PATENT AND TRADEMARK OFFICE
CERTIFICATE OF CORRECTION

PATENT NO. : 6,903,881 B2
DATED : June 7, 2005
INVENTOR(S) : Baba

It is certified that error appears in the above-identified patent and that said Letters Patent is hereby corrected as shown below:

<u>Column 3,</u>
Line 49, change to read:
-- $Z = C \cdot (X^2 + Y^2) / [1 + \{1 - K \cdot C^2 \cdot (X^2 + Y^2)\}^{1/2}] + \Sigma A_n \cdot Y^n + \Sigma C_{ij} \cdot x^i \cdot y^j$
... Equation (A) -- ; and <u>Column 6,</u>
Table 3, column C22, line 1, change "-2.0931E-3" to -- -2.093E-3 --.

Signed and Sealed this

Twenty-third Day of August, 2005

JON W. DUDAS
*Director of the United States Patent and Trademark Office*